Jan. 18, 1966  K. A. GRAHAM  3,230,404
DAMPING MEANS FOR CLAW TOOTH ROTORS
Filed Oct. 10, 1961  4 Sheets-Sheet 1
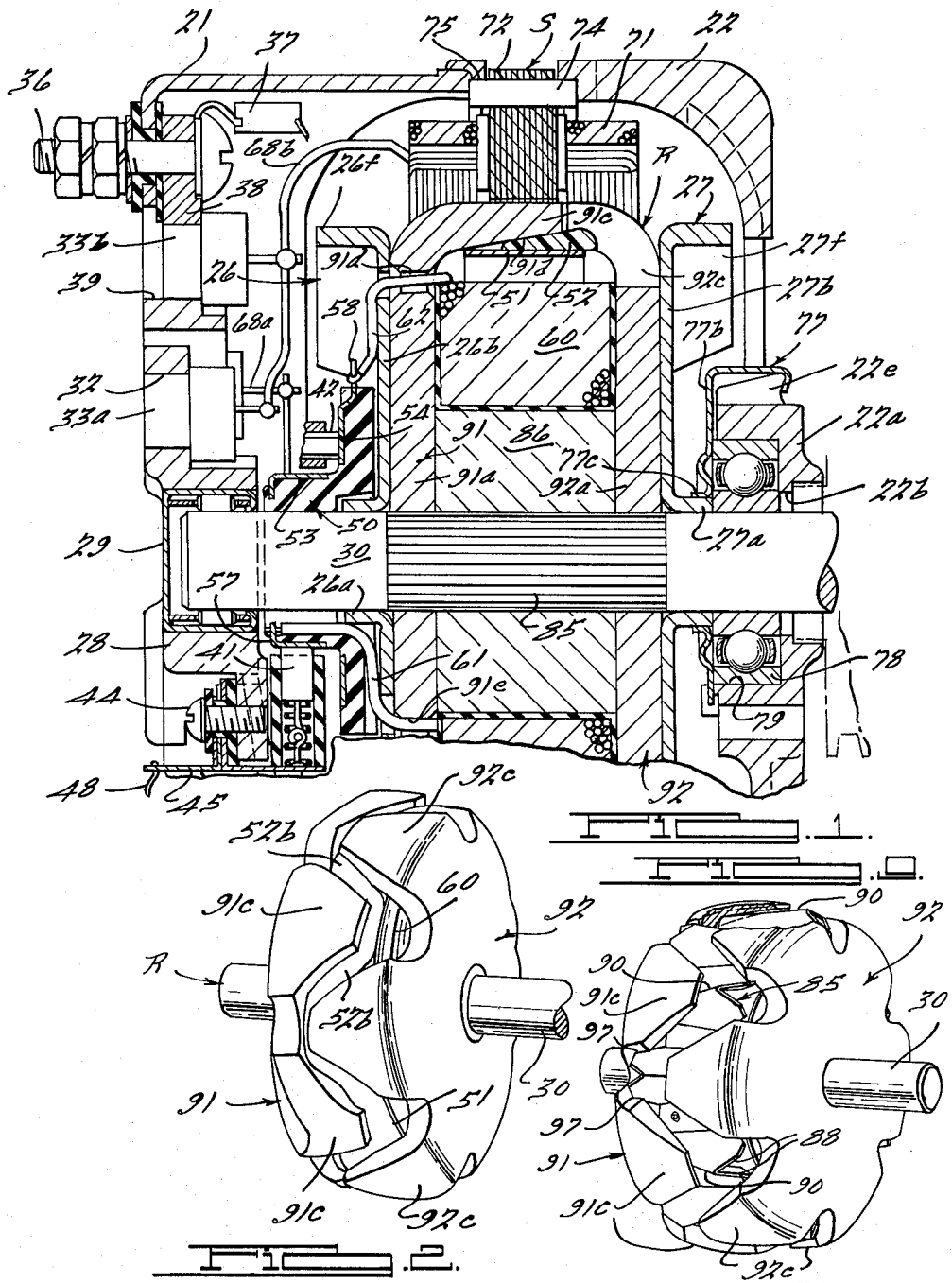
INVENTOR.
Kenneth A. Graham
BY
Harness and Harris
ATTORNEYS

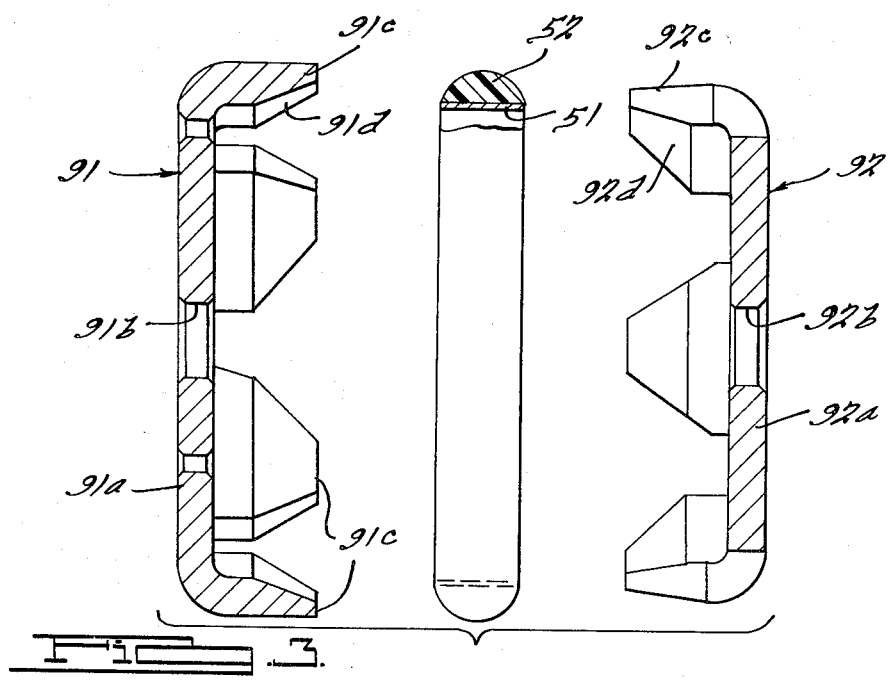
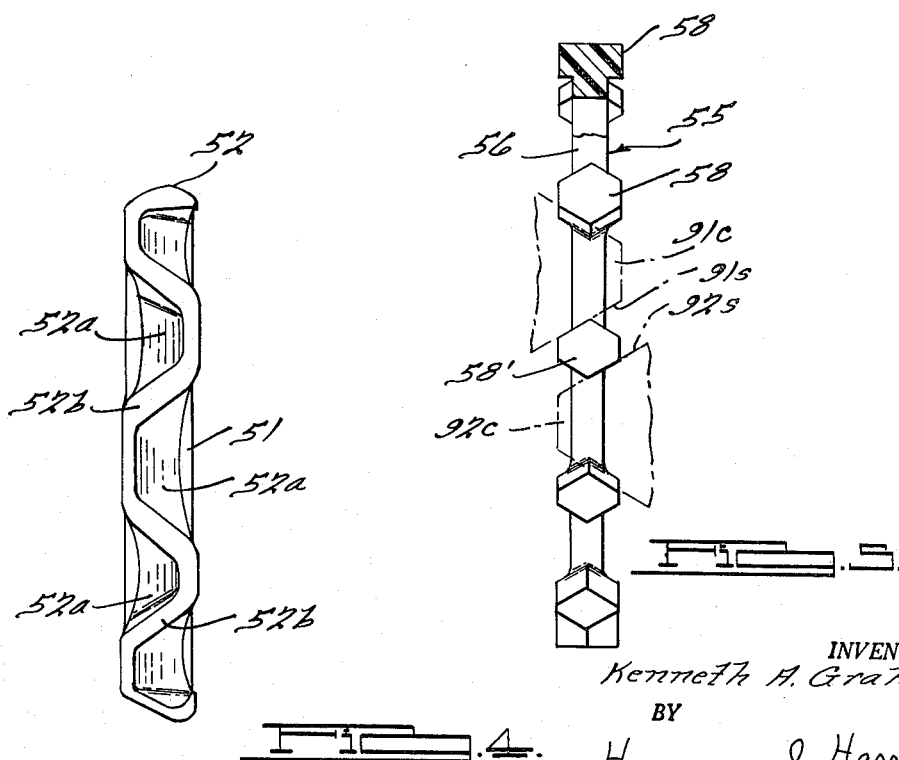

Jan. 18, 1966 K. A. GRAHAM 3,230,404
DAMPING MEANS FOR CLAW TOOTH ROTORS
Filed Oct. 10, 1961 4 Sheets-Sheet 3
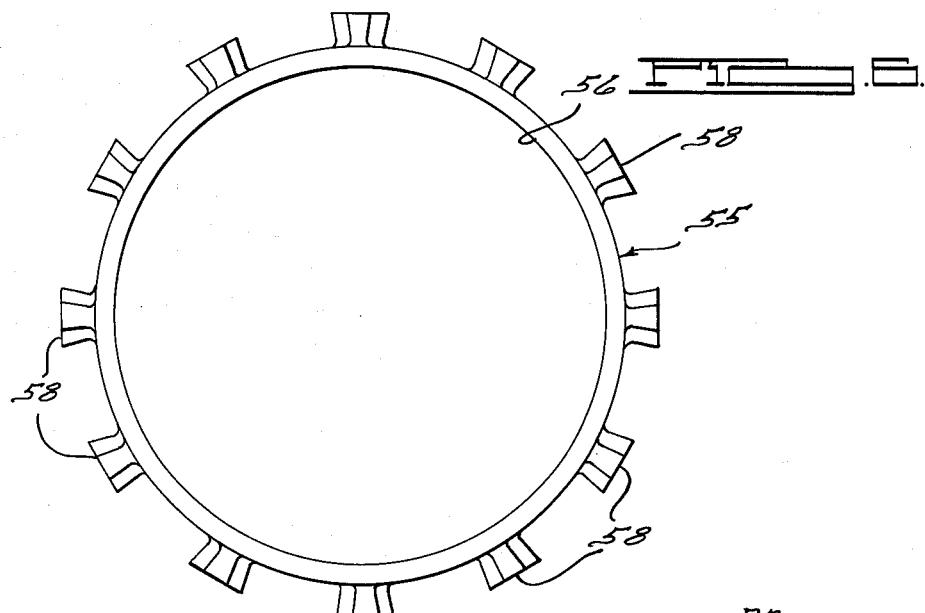
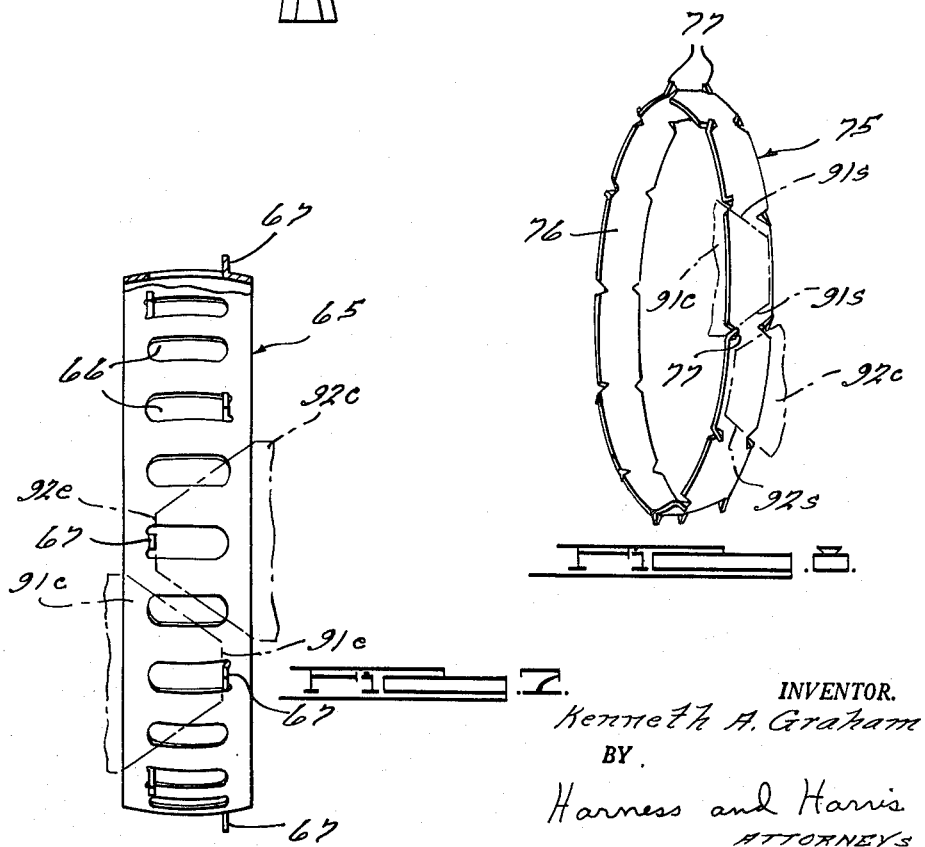
INVENTOR.
Kenneth A. Graham
BY
Harness and Harris
ATTORNEYS Jan. 18, 1966  K. A. GRAHAM  3,230,404
DAMPING MEANS FOR CLAW TOOTH ROTORS
Filed Oct. 10, 1961  4 Sheets-Sheet 4
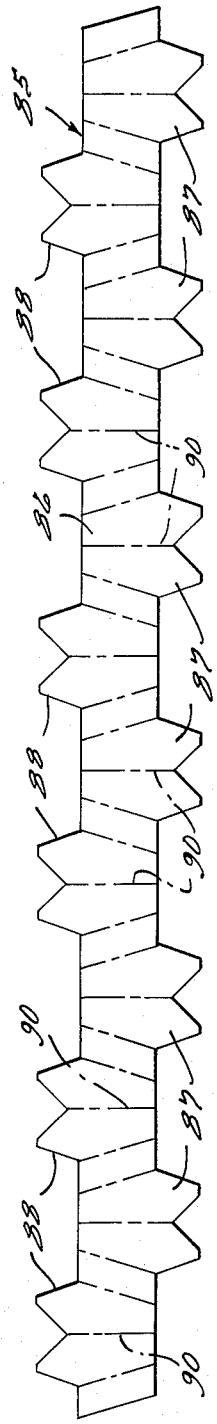
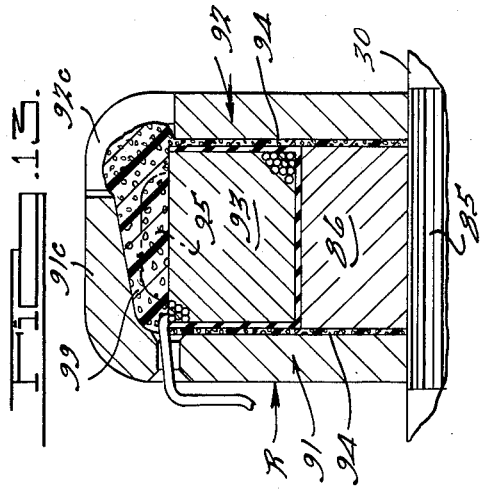
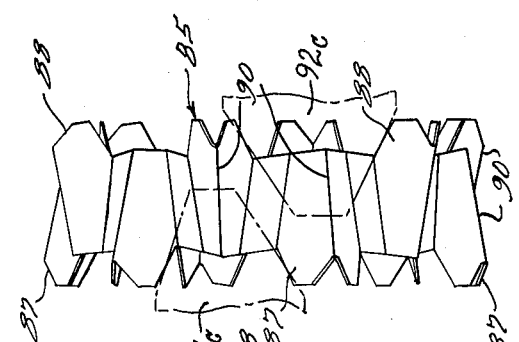
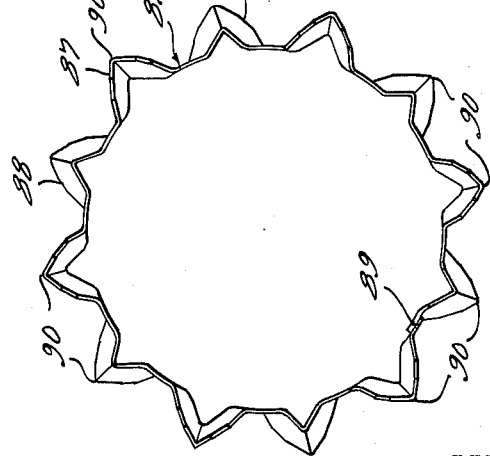
INVENTOR.
Kenneth A. Graham
BY
Harness and Harris
ATTORNEYS

United States Patent Office 3,230,404
Patented Jan. 18, 1966

3,230,404
DAMPING MEANS FOR CLAW TOOTH ROTORS
Kenneth A. Graham, Birmingham, Mich., assignor to Chrysler Corporation, Highland Park, Mich., a corporation of Delaware
Filed Oct. 10, 1961, Ser. No. 144,156
7 Claims. (Cl. 310—51)

This invention relates to a dynamo-electric machine rotor and particularly to vibration or noise damping means for the pole fingers of cup-shaped pole pieces used in such rotors.

The inventions disclosed herein represent variations of the rotor pole piece vibration damping means shown in the co-pending U.S. patent application of Glenn S. Farison, Serial No. 26,300, filed May 2, 1960, which application is assigned to Chrysler Corporation, the assignee of the inventions herein disclosed.

It is a primary object of this invention to provide an economical, efficient, easily installed, simplified form of vibration damping ring for insertion beneath the intermeshed pole fingers of cup-shaped pole pieces of a dynamo-electric machine rotor.

It is still another object of this invention to provide rotor pole finger noise damping rings that may be simple in form, easy to install and designed in such a manner that they will overcome any normal variances in manufacturing tolerances of the rotor components and function in an efficient manner at all times.

It is still another object of this invention to provide rotor pole finger noise damping ring means that can be compressively inserted beneath the intermeshed pole fingers so as to rigidify the rotor structure and eliminate noise problems that would otherwise result from pole finger vibrations.

Other objects and advantages of this invention will be readily apparent from a reading of the following description and a consideration of the related drawings:

FIG. 1 is a fragmentary sectional elevational view of an induction type electrical energy generating machine commonly referred to as an alternator;

FIG. 2 is a perspective view of the rotor unit used in the FIG. 1 alternator which rotor unit includes a vibration or noise damping ring embodying one form of this invention;

FIG. 3 is an exploded sectional elevational view of the pole pieces and noise damping ring used in the FIG. 2 rotor;

FIG. 4 is a side elevational view of the noise damping ring shown in FIGS. 1–3 after it has been compressed beneath the pole piece fingers;

FIG. 5 is an end elevational view, partly in section, of a second form of noise or vibration damping ring for use in rotors having intermeshed pole fingers;

FIG. 6 is a side elevational view of the noise damping ring shown in FIG. 5;

FIG. 7 is an end elevational view of a third form of noise or vibration damping ring for use with rotor pole pieces having intermeshed pole fingers;

FIG. 8 is a perspective view of a fourth form of noise or vibration damping ring for use with rotor pole pieces having intermeshed pole fingers;

FIG. 9 is a perspective view, with portions broken away, of a rotor having a fifth form of noise or vibration damping ring applied beneath the pole fingers of the rotor pole pieces;

FIG. 10 is a plan view of the blank from which the FIG. 9 noise ring is fabricated;

FIG. 11 is a side elevational view of the noise or vibration damping ring shown in FIG. 9;

FIG. 12 is an end elevational view of the noise or vibration damping ring shown in FIGS. 9 and 11; and FIG. 13 is a sectional elevational view of a dynamo-electric machine rotor having a noise damping ring of heat expandible foam material applied between the rotor coil and the surrounding rotor pole pieces.

Looking particularly at FIG. 1 of the drawings, it will be seen that this alternator-rectifier unit comprises a pair of slotted housing or shield assemblies 21 and 22 that are axially spaced apart by a stator unit S. Housing piece 21, that is shown at the front or left side of FIG. 1 is denoted the rectifier end of the housing. It includes a plurality of peripherally located slots (not shown) that cooperate with fan elements 26 and 27 fixed to the rotor unit R to provide for the circulation of cooling air through the alternator-rectifier unit during operation thereof. Housing rectifier piece 21 is formed with a rotor shaft bearing seat 28 at its center portion that receives a cup contained roller bearing assembly 29. Roller bearing assembly 29 is preferably mounted in the housing seat 28 by means of a press fit.

Also included in the housing piece 21 are three bores 32 (one shown) adapted to receive the three negative polarity rectifiers 33a. A conductor heat sink unit 38 is bolted to the housing piece 21 by bolt assembly 36. Three positive polarity rectifiers 33b (one shown) are pressed into bores 39 in the heat sink conductor 38. Rectifiers 33a and 33b are preferably of the silicon diode-type even though selenium rectifiers or some other equivalent types could be used in place of the silicon diodes. Each pair of rectifiers 33a and 33b are connected together and to one of the three phase windings 71 of the stator S by the conductors 68a, 68b. The rectifiers 33a and 33b are connected to a battery or standby power source for the associated electrical system through heat sink conductor 38 that is connected to battery through the screw post terminal 36 in end piece 21.

Mounted on the housing piece 21 are the slip ring brush assemblies 41 and 42 respectively. Brush assembly 41 is designated as a radially extending brush assembly whereas assembly 42 is designated an axially extending brush assembly. These brush assemblies 41 and 42 are fixed to the housing piece 21 by screw means 44 that extend through the mounting pieces 45 for the brush assemblies and threadably anchor in tapped bores in the housing piece 21. The brush assembly 41 is connected to the battery or other standby electrical power source by the conductor wire 48. The brush assembly 42 is connected to ground through the housing piece 21.

The drive end housing piece 22 (see FIG. 1) is generally similar in design to the rectifier end housing piece 21 in that it is slotted to provide for maximum cooling air flow through the alternator unit by the centrifugal fans 26, 27. As can be clearly seen from FIG. 1, the end piece 22 is formed with a circular hub portion 22a that is pierced by a bore 22b to receive the drive end of the rotor shaft 30. The clamp 77 has a circular hub portion 77b that is adapted to bear against and hold the pre-lubricated ball bearing assembly 78 in the recessed seat 79 in end piece hub portion 22a. In addition to providing a portion 77b to hold the bearing assembly 78 in the recess 79, the clamp 77 has an axially extending flange portion 77c formed at its inner periphery adjacent the bore therein that receives the rotor shaft 30.

As can be seen from FIG. 1, the two housing pieces 21, 22 are assembled in fixed spaced relationship by having sandwiched therebetween the stator unit S. Stator unit S comprises a stack of annular plates 72 that are maintained in assembled relationship by a group of circumferentially spaced pins 74 that are pressed into aligned mating openings in the stacked plates 72. The pins 74 that connect the stator plates 72 serve a dual function in that they are of predetermined, accurately formed, lengths so as to project outwardly beyond the plates 72 and provide stud portions that seat in bores 75 in the end pieces 21, 22. The housing end pieces 21, 22 are thus accurately spaced apart the prescribed distance by the stator plate assembly pins 74, regardless of minor variations in width of the stacked plate assembly of the stator unit S.

The stacked plates 72 are pierced by circumferentially spaced, radially extending slots that receive the Y-connected coils of insulated conductor wires that form the three phase windings 71 of the stator unit S. The windings 71 are insulated from the stacked metal plates 72 by a suitable coating of insulator material. The particular manner in which the windings 71 are applied to the slotted stator plates 72 is not a part of the invention disclosed and claimed in this application. Suffice it to say that one end of each of the three coil wires of the windings 71 is connected to a different pair of diodes 33a, 33b whereas the other ends of each of the three coil wires are connected together by a suitable Y connector (not shown).

The magnetizable rotor unit R that is rotatably mounted in the spaced housing ends 21, 22 comprises the rotor shaft 30 that has its dead end mounted in the bearing assembly 29 and its live or driving end mounted in the bearing assembly 78. Shaft 30 is preferably knurled, grooved or splined, as shown at 85, to assist in drivingly connecting the metallic, magnetizable, rotor hub disc 86 to the shaft 30 by a press-on operation. Surrounding and seated on the outer periphery of the hub disc 86 is the magnetic field coil 60 of the rotor unit R. Pressed on to the shaft 30, so as to abut the sides of the rotor hub 86 and the rotor coil 60, are a pair of metallic, magnetizable, rotor pole pieces 91 and 92 respectively. These pole pieces 91 and 92 are each of substantially cup-shaped formation and comprise an annular disc portion 91a or 92a having a central shaft receiving bore therein such as 91b or 92b. The discs 91a and 92a are provided around their outer periphery with a plurality of, six in this instance, right angularly disposed, axially extending, equally spaced, pole fingers such as 91c and 92c respectively. The pole fingers 91c and 92c are offset circumferentially with respect to each other so that they are arranged in interpolar or circumferentially staggered or intermeshed, spaced, relationship, as shown in FIG. 2 particularly. The degree of axial overlap of the free ends of the pole pieces 91c, 92c is also thought to be clearly shown in FIGS. 1 and 2. From FIG. 1 it is obvious that the coil spaced rotor pole pieces 91, 92 with the intermeshed pole fingers 91c, 92c provide a substantially closed casing about the magnetic field coil 60.

The pole pieces 91, 92 are of relatively thin stock for their particular purpose and for that reason they are adapted to be fashioned by a stamping process that is quite economical. While the lightweight economical pole construction utilized in this alternator is quite advantageous, still, it could introduce noise problems due to vibration of the plates 91a, 92a and the pole fingers 91c, 92c if means were not provided to frictionally damp such vibrations. Novel means of damping any noise vibrations that might arise from this type of rotor construction are shown in the several figures of the drawing.

It has been found from experimental investigations with inductor type dynamo-electric machines, such as that herein disclosed, that noise is created in such machines due to variations in the magnetic forces in the rotor-stator air gap caused by the existence of the stator slots that receive the stator coil windings. An additional noise that frequently appears at a fixed frequency is created by the rotor poles when the natural frequency of the poles and the electromagnetic forces are in resonance.

It will be noted from FIGS. 1–4 that a strip-like circular band 51 of lightweight material, such as aluminum or cardboard, encircles the rotor coil 60 and is of such a diameter that it can just be forced beneath the rotor pole fingers 91c, 92c. This flexible band 51 is initially prepared with a rim of thermosetting epoxy paste 52 (see FIG. 3) on its outer peripheral surface. When the two pole pieces 91, 92 (see FIG. 3) are pressed towards one another during their assembly on the rotor shaft 30, then the epoxy paste rim 52 is reshaped to the form shown clearly in FIGS. 1 and 4. From FIG. 4 it will be noted that the epoxy paste ring 52 is distorted such that it has tapering flat portions 52a that seat in face-to-face contact with the undersides 91d, 92d of the tapered pole fingers 91c and 92c. Also, portions of the epoxy paste ring 52 that are displaced by the pole finger surfaces 91d, 92d are forced up between the sides of the pole fingers to provide the raised rib portions 52b that wedgingly separate the pole fingers. When the rotor is subsequently heated to cure the epoxy paste ring 52 there is a unitary rigid ring structure of epoxy resin interconnecting the sides and underfaces of the pole fingers 91c, 92c. This hardened epoxy ring functions to damp any vibrations of the pole pieces or their fingers 91c, 92c that might tend to create noise problems during rotation of the rotor R.

FIGS. 5 and 6 show another form of noise damping ring 55 wherein a plastic material is used to wedgingly hold the pole fingers 91c, 92c in relatively fixed, spaced apart, positions. In this form of the invention a band-type rim of acetal resin, known in the trade as Delrin, is molded or otherwise formed to provide ring-like band 56 having circumferentially spaced, radially extending, polygonal shaped, wedge plugs 58 projecting from its outer surface. The ring portion 56 is arranged to be positioned around the rotor coil 60 immediately beneath the pole fingers 91c, 92c with the wedge plugs 58 extending between the adjacent sides 91s, 92s of the pole piece fingers 91c, 92c. It will be noted from FIG. 5 that the wedge plugs 58 are hexagonally shaped with two opposed side faces of the plugs 58 being wedgingly compressed between the opposed sides 91s, 92s of adjacent pole fingers. It will also be noted from FIG. 5 that the act of pressing the opposed pole pieces 91, 92 towards one another twists the plugs 58 out of their normal shape, see plug 58′, so that the plugs 58 are stressed in torsion as well as compression when they are mounted in position.

FIG. 7 shows still another form of this invention wherein a resilient metal, or similar resilient material band 65 is compressively anchored beneath the underfaces 91d, 92d of the pole pieces 91c, 92c. This band 65 is quite similar to the band shown in the aforementioned Glenn S. Farison pending application Serial No. 26,300 but includes an improvement thereto. It will be noted that band 65 is formed with a plurality of transversely extending, circumferentially spaced, slots 66. Every other slot 66 has a tab 67 turned up at one end of the slot 66 so that the tab will be compressed against the end 91e or 92e of the adjacent pole finger 91c or 92c. The adjacent tabs 67 are at opposite ends of their slots so that they will abut against the end 91e or 92e of the adjacent pole finger. The band 65 is preferably arched transversely as can be seen from FIG. 7 so that it will be slightly flattened as it is compressed beneath the pole finger underfaces 91c, 92c. The flexible noise damping band 65 can be fabricated from such materials as stainless steel, phosphor bronze, brass, aluminum, or any similar metals or alloys thereof.

FIG. 8 shows another form of this invention 75 wherein a substantially flat metal circular band 76 has pole finger engaging tabs 77 turned up from its side edge portion. The tabs 77 extend transversely of the width of the strip 76 at an angle approximating the angle of the pole finger side faces 91s, 92s. The tabs 77 are spaced circumferentially a distance slightly less than the spacing of the pole finger portions engaged therebetween so that the tabs compressively engage the side faces 91s, 92s of the associated pole fingers. Materials such as those enumerated with respect to the FIG. 7 form of noise damping ring may also be used to fabricate the ring shown in FIG. 8.

FIGS. 9–11 show still another form of noise damping ring for the rotor pole pieces. In this form of the invention the noise damping ring 85 comprises a resilient metal band 86 that can be brass, or some other relatively cheap material. The flat blank 86 from which this noise damping ring is fabricated is shown in FIG. 10. Strip 86 is corrugated with oppositely tapering, adjacent, V-shaped, rib-like, formations 87, 88. The free ends of the strip blank 86 are overlapped (see FIG. 11) and joined by welding, brazing, riveting, or the like, as indicated at 89. The crests 90 of the adjacent V-shaped corrugations are arranged to extend along and compressively bear against the underside faces 91d, 92d of the pole fingers 91c, 92c respectively. It will be noted from FIGS. 9 and 12 that the corrugation crests 90 extend along the centerlines of the pole fingers and taper in the same direction as the pole finger underfaces 91d, 92d. The pole finger support by this form of pole tip wedge ring is a most rigid and direct method and has given excellent noise and vibration damping results. It is thought that this type of support is the best possible to prevent pole tip vibration. From FIGS. 9 and 12 it will be noted that the pole tip wedging towers or corrugations 87, 88 not only contact the pole fingers 91c, 92c along the tower crests 90 but also the end edges of the towers or corrugations 87, 88 are engaged with the pole pieces at the locations 97. It is believed that this additional support of the pole pieces at the locations 97 may contribute to the excellent performance of this type of vibration damping wedge ring.

FIG. 13 shows still another form of rotor pole noise damping ring that has been giving excellent performance. In this form a ring 95 of paste-like heat expandable plastic or rubberlike material is wrapped about a rotor coil 93 that may have its sides slightly spaced from the adjacent pole pieces as indicated by the areas 94. When the rotor R with the applied paste ring 95 is heated the paste-like material 95 expands to fill the spaces 94 at the sides of the rotor coil 93 and to also fill the space 99 between the coil 93 and the surrounding pole fingers 91c, 92c. Also, some of the foamable material 95 expands outwardly between the side edges of the pole fingers to provide pole connecting ribs similar to the ribs 52b shown in the FIGS. 1-4 form of this invention.

While various plastic and rubberlike heat expanding foams can be used for noise damping as suggested by FIG. 13, one of those tested and found to be quite satisfactory is a nitrile polyvinylchloride. During the heating of this material minute gas bubbles are generated in the material which causes the material to expand and fill the space between the rotor coil and the pole pieces as well as the space between the adjacent pole fingers. The foam hardens to a solid mass that interconnects the pole pieces and damps any vibrations thereof that might be a source of noise. The foam also acts as an insulator between the coil 93 and the pole pieces 91, 92.

I claim:

1. In a dynamo-electric machine rotor comprising a rotor hub having a rotor magnetic coil supported thereon, a pair of cup-like pole pieces mounted on said hub with the cup bottom walls extending radially therefrom and having the rotor coil sandwiched therebetween, said cups opening towards each other and having the side walls thereof each formed with axially extending, circumferentially spaced, intermeshed, pole fingers that are spaced radially outwardly from and surrounding the rotor coil outer periphery, and a pole piece vibration damping means arranged concentrically between the rotor coil and the pole fingers with portions thereof engaged with said fingers, said damping means comprising a compressible, resilient metallic ring having radially outwardly extending portions thereof compressed against and extending between and interconnecting the side faces of adjacent pole fingers and exerting an expanding force thereagainst to damp vibrations thereof.

2. In a dynamo-electric machine rotor comprising a rotor hub, having a rotor magnet supported thereon, a pair of cup-like pole pieces mounted on said hub with the cup bottom walls extending radially therefrom and having the rotor magnet sandwiched therebetween, said cups opening towards each other and having the side walls thereof each formed with axially extending, circumferentially spaced, intermeshed, pole fingers that are spaced radially outwardly from and surrounding the rotor magnet outer periphery, and a pole piece vibration damping means arranged concentrically between the rotor magnet and the pole finger with portions thereof engaged with said fingers, said damping means comprising a ring-like resilient metal band formed with transversely extending corrugations that have crest portions compressed beneath and arranged to frictionally engage the underfaces of the pole fingers and exerting an expanding force thereagainst to damp vibrations thereof.

3. In a dynamo-electric machine rotor comprising a rotor hub having a rotor coil supported thereon, a pair of cup-like pole pieces mounted on said hub with the cup bottom walls extending radially therefrom and having the rotor coil sandwiched therebetween, said cups opening towards each other and having the side walls thereof each formed with axially extending, circumferentially spaced, intermeshed, pole fingers that are spaced radially outwardly from and surrounding the rotor coil outer periphery, and a pole piece vibration damping means arranged concentrically between the rotor coil and the pole fingers with portions thereof engaged with said fingers, said clamping means comprising a ring-like resilient metal band formed with transversely extending corrugations that have crest portions compressed beneath and arranged to frictionally engage the underfaces of the pole fingers and exerting an expanding force thereagainst to damp vibrations thereof, said corrugations being V-shaped in cross section and tapering in height and width from one end towards the other end.

4. In a dynamo-electric machine rotor comprising a rotor hub having a rotor magnet supported thereon, a pair of cup-like pole pieces mounted on said hub with the cup bottom walls extending radially therefrom and having the rotor magnet sandwiched therebetween, said cups opening towards each other and having the side walls thereof each formed with axially extending, circumferentially spaced, intermeshed, pole fingers that are spaced radially outwardly from and surrounding the rotor magnet outer periphery, and a pole piece vibration damping means arranged concentrically between the rotor magnet and the pole fingers with portions thereof engaged with said fingers, said clamping means comprising a ring-like, resilient metal band formed with transversely extending corrugations that have crest portions arranged to frictionally engage the underfaces of the pole fingers and end edge portions that are arranged to engage portions of the cup bottom walls with said corrugations exerting expanding forces against the pole fingers to damp vibrations thereof.

5. In a dynamo-electric machine rotor comprising a rotor hub having a rotor coil supported thereon, a pair of cup-like, independently supported, pole pieces mounted on said hub with each of the cup bottom walls extending radially therefrom and having the rotor coil sandwiched therebetween, said cups opening towards each other and having the side walls thereof each formed with axially extending, circumferentially spaced, intermeshed, pole fingers that are spaced radially outwardly from and surrounding the rotor coil outer periphery, and a pole finger vibration damping means arranged concentrically between the rotor coil and the pole fingers with portions thereof engaged with said fingers, said damping means comprising a flexible, resilient, non-magnetic, metal ring compressively wedged against the axially extending underfaces of said pole fingers and having tabs projecting radially outwardly therefrom engaging the side edges of said pole fingers and exerting an expanding force thereagainst to damp vibrations thereof.

6. In a dynamo-electric machine rotor comprising a rotor hub having a rotor magnet supported thereon, a pair of cup-like, independently supported, pole pieces mounted on said hub with each of the cup bottom walls extending radially therefrom and having the rotor magnet sandwiched therebetween, said cups opening towards each other and having the side walls thereof each formed with axially extending, circumferentially spaced, intermeshed, pole fingers that are spaced radially outwardly from and surrounding the rotor magnet outer periphery, and a pole finger vibration damping means arranged concentrically between the rotor magnet and the pole fingers with portions thereof engaged with said fingers, said damping means comprising a slotted flexible, resilient, non-magnetic, metal ring compressively wedged against the axially extending underfaces of said pole fingers and having tabs projecting radially outwardly therefrom engaging the side edges of said pole fingers and exerting an expanding force thereagainst to damp vibrations thereof.

7. In a dynamo-electric machine rotor comprising a rotor hub having a rotor coil supported thereon, a pair of cup-like, independently supported, pole pieces mounted on said hub with each of the cup bottom walls extending radially therefrom and having the rotor coil sandwiched therebetween, said cups opening towards each other and having the side walls thereof each formed with axially extending, circumferentially spaced, intermeshed, pole fingers that are spaced radially outwardly from and surrounding the rotor coil outer periphery, and a pole finger vibration damping means arranged concentrically between the rotor coil and the pole fingers with portions thereof engaged with said fingers, said damping means comprising a slotted flexible, resilient, non-magnetic, metal ring compressively wedged against the axially extending underfaces of said pole fingers and having tabs projecting radially outwardly therefrom engaging the ends of said pole fingers and exerting an expanding force thereagainst to damp vibrations thereof.

References Cited by the Examiner
UNITED STATES PATENTS

| | | | |
|---|---|---|---|
| 2,672,564 | 3/1954 | Krasno | 310—263 X |
| 2,795,715 | 6/1957 | Gilchrist | 310—263 |
| 2,928,963 | 3/1960 | Bertsche | 310—168 |
| 2,987,637 | 6/1961 | Bertsche | 310—263 |
| 3,072,811 | 1/1963 | Jaeschke | 310—105 |
| 3,134,039 | 5/1964 | Bosch | 310—263 X |

ORIS L. RADER, *Primary Examiner.*

MILTON O. HIRSHFIELD, *Examiner.*